Sept. 29, 1953  R. C. MAXANT  2,653,663
SWATCH CUTTING MACHINE
Filed March 3, 1950  4 Sheets-Sheet 1
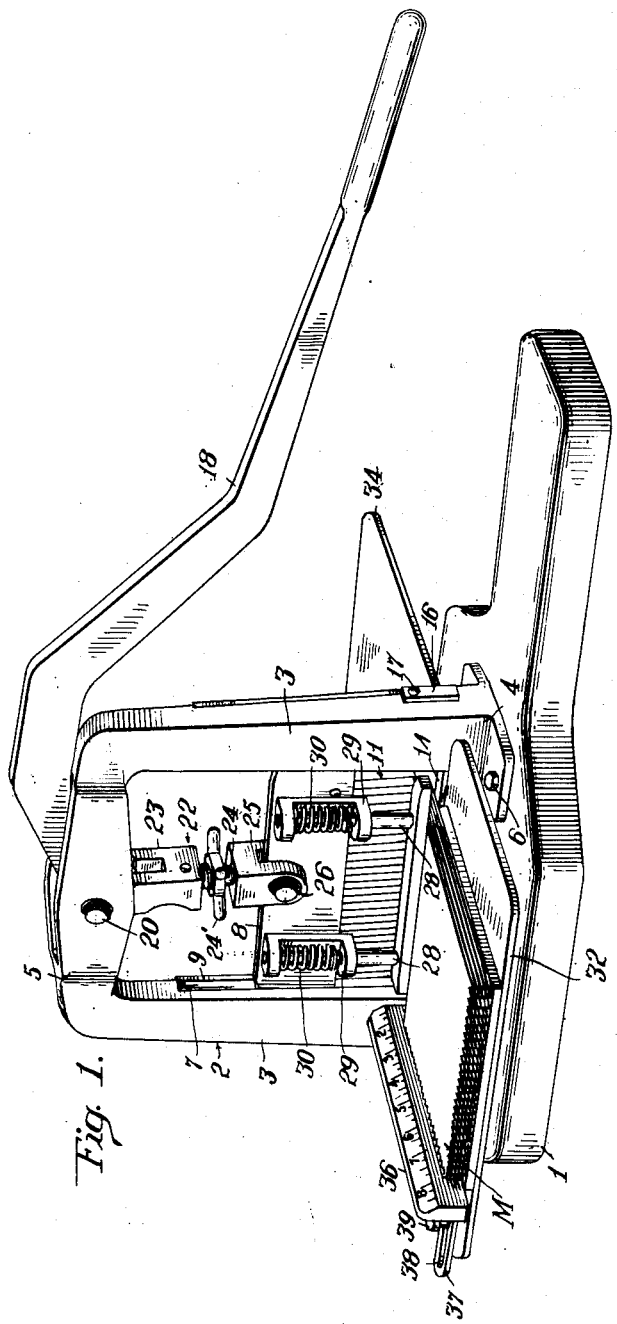
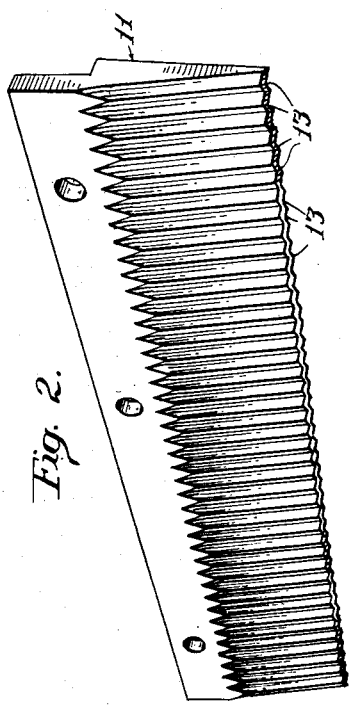
INVENTOR
Richard C. Maxant
BY
ATTORNEYS

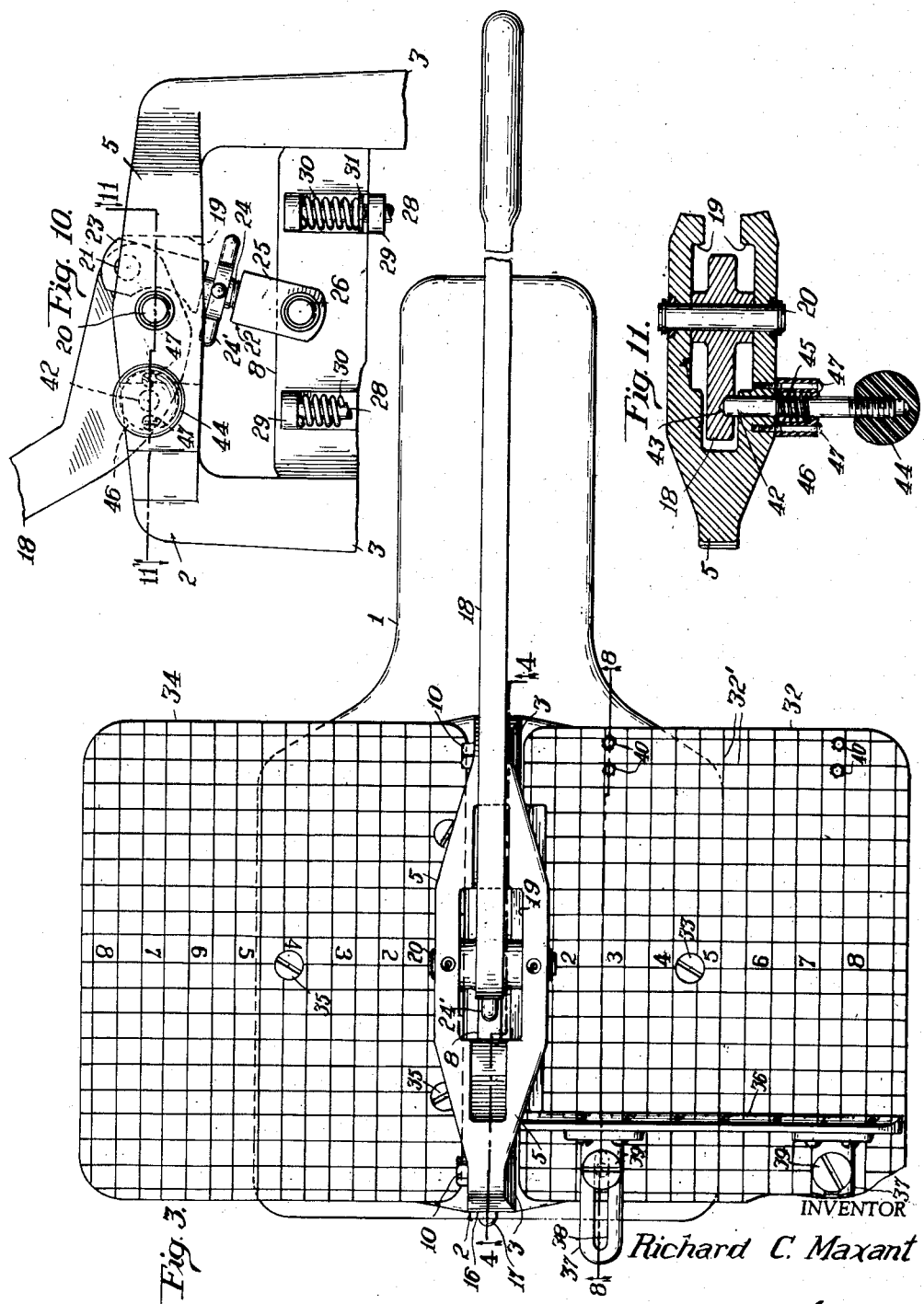

Sept. 29, 1953   R. C. MAXANT   2,653,663
SWATCH CUTTING MACHINE
Filed March 3, 1950   4 Sheets-Sheet 3

INVENTOR
Richard C. Maxant
BY
ATTORNEYS

Sept. 29, 1953  R. C. MAXANT  2,653,663
SWATCH CUTTING MACHINE
Filed March 3, 1950  4 Sheets-Sheet 4
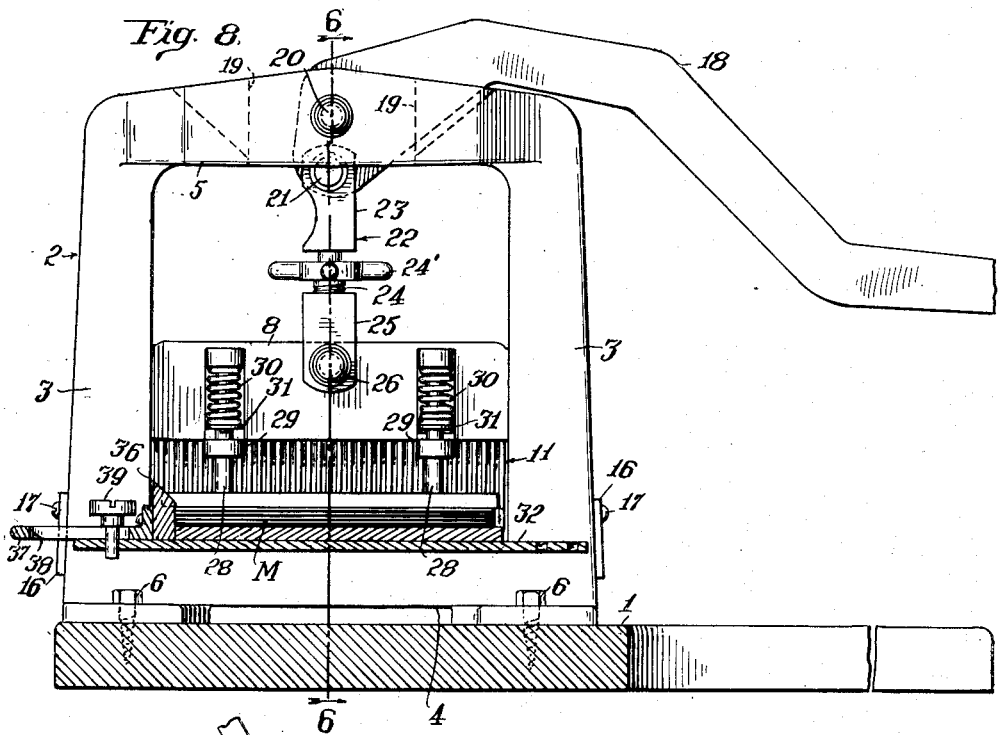
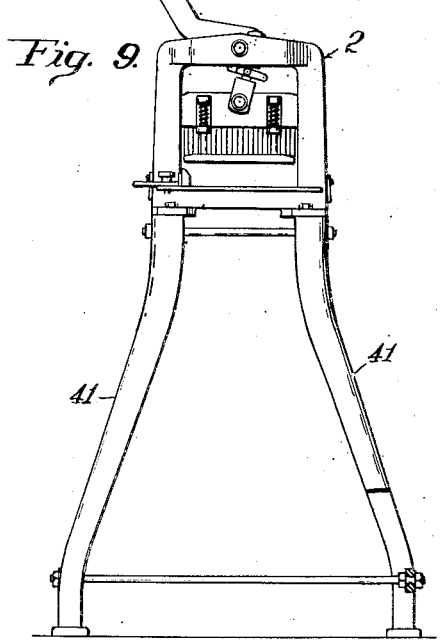
INVENTOR
Richard C. Maxant
BY Cyrus Kehr & Smecker
ATTORNEYS Patented Sept. 29, 1953

2,653,663

UNITED STATES PATENT OFFICE 2,653,663

SWATCH CUTTING MACHINE

Richard C. Maxant, Ayer, Mass.

Application March 3, 1950, Serial No. 147,427

3 Claims. (Cl. 164—57)

This invention relates to improvements in swatch cutting machine of the character used for cutting and pinking samples of cloth.

Various garment manufacturers make up sample books to submit to their salesmen and customers, each of which is formed of a number of samples of cloth arranged in a pile of a desired thickness, with notched edges to facilitate handling and prevent raveling of the samples. It is desirable that these samples or swatches be of uniform size, generally square or rectangular, to be put together in books. While machines have been provided heretofore for cutting and forming such swatches, they have been rather complex of structure, expensive to build, and difficult of operation.

One object of this invention is to improve the construction of swatch cutting machines for the purpose described so these may be light in weight, easy to operate, and may be made portable to facilitate transportation and handling thereof.

Another object of the invention is to provide for a more effective cutting action by an adjustment of the blade with respect to the operating lever, as well as a knuckle action which will facilitate the effective operation of the blade.

Still another object of the invention is to provide on one of the work plates a guide for the material, which is adjustable with respect thereto, to provide for cutting samples of different sizes and insuring that these will be absolutely square or rectangular, as desired.

Other features of the machine include the manner in which the material is clamped adjacent the cutter, the mounting of the cutter block for removal from the machine either for replacement or for turning to another position, and a provision for locking the operating handle in one position to prevent accidental dropping of the cutter or knife, which might cause injury to a workman. Provision is made for use of these several features, if desired, although they may be omitted, or other changes made in the construction as may be found practical.

Certain embodiments of the invention are illustrated in the accompanying drawings, in which:

Fig. 1 is a perspective view of the swatch cutter in one form;

Fig. 2 is a perspective view of the knife thereof, detached;

Fig. 3 is a top plan view of the form of machine shown in Fig. 1;

Fig. 8 is a cross section, partly in elevation, through the machine on the line 8—8 in Fig. 3;

Fig. 9 is a side elevation of the swatch cutter mounted on supporting legs;

Fig. 10 is a detail side elevation showing a modification of the machine having a handle lock; and Fig. 11 is a horizontal section therethrough on the line 11—11 in Fig. 10.

Figure 4:
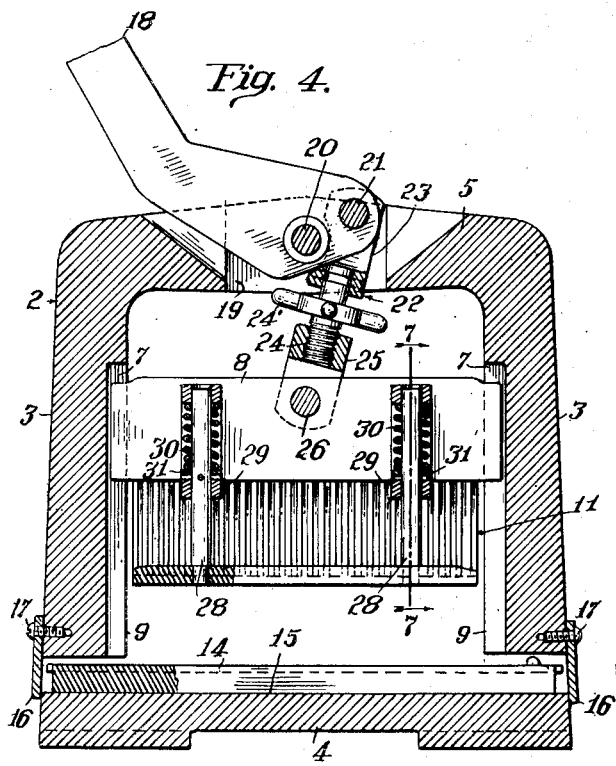
Fig. 4 is a cross section therethrough on the line 4—4 in Fig. 3, with the parts in one position having the cutter raised.

Referring to the form of swatch cutter shown in Figs. 1 to 8, this is shown as mounted on a bed plate, generally designated at 1, which may be formed of any suitable material, such as wood, plastic or metal, as desired. The shape thereof provides a secure support for the body of the machine, while preventing tipping over of the machine during operation. Thus, the bed plate 1 is provided with a wide portion at one end thereof upon which the frame of the machine is mounted directly, while the opposite end of the bed plate may be reduced in width to prevent tipping over of the machine. At the same time, the shape thereof does not interfere with proper access to the machine for operation, and provides for ready portability thereof.

Mounted on the bed plate 1 is an upstanding frame, generally designated at 2. The frame 2 includes transversely spaced opposite sides 3 connected together at the bottom by means of a base 4 and at the top by a cross bar 5. These parts 3—5 are shown as forming substantially a rectangular frame open in the center to receive the operating parts of the machine. The base portion of the frame is shown as anchored securely by screws 6 to the bed plate 1.

Figure 5:
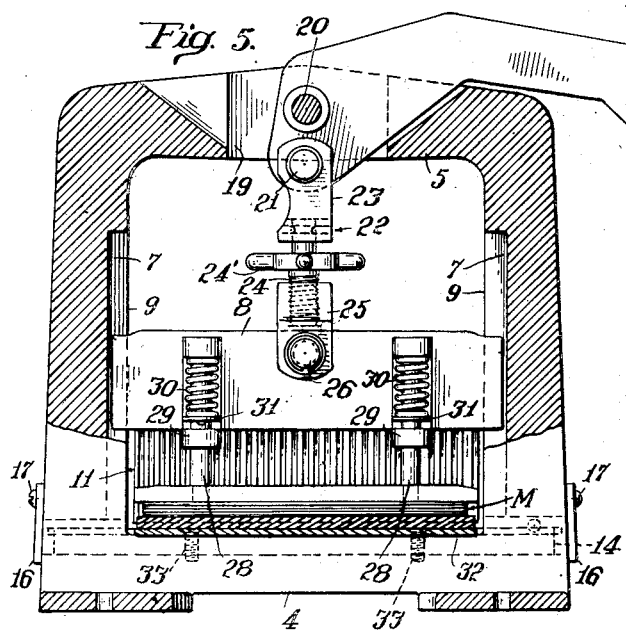
Fig. 5 is a similar view showing the parts in their cutting position.

At their inner faces the opposite sides 3 of the frame are provided with lengthwise extending guideways 7 arranged in opposing relation, as shown in Figs. 4 and 5, and receive therein the opposite ends of a head 8. The latter is in the form of a flat plate adapted for reciprocating movement vertically in the guideways 7, and is held in upright position by the guiding action of the guideways. One side of each guideway 7 is closed by a removable cover plate 9 detachably mounted on the frame sides 3 by set screws 10, to facilitate insertion or removal of the head 8.

The head 8 carries a knife 11 secured to a side face thereof by set screws 12 to facilitate removal of the knife from the head 8 for replacement or sharpening thereof. The knife 11 is shown as having a pinking edge 13 to facilitate the pinking of the cloth during the cutting operation. However, if the pinking action is not required, the knife may be formed with a straight edge or of other shape.

The knife 11 is adapted to operate against a cutter block 14 mounted in a groove 15 provided in the base portion 4 of the frame. This groove extends, preferably, to opposite sides of the frame at the extreme ends of the base portion 4 to facilitate insertion and removal of the cutter block. This cutter block, preferably, is formed of fiber of multiple sides, each of which may form a cutting surface. The cutter block may be taken out and turned over to present a new cutting surface when one surface thereof becomes worn. The cutter block 14 is confined, normally, in the groove 15 by hangers 16 pivotally supported on set screws 17 secured in the outer faces of the frame side members. These hangers 16 may be turned laterally out of the path of the cutter block 14 for access to the cutter block for removal thereof and replacement.

The head 8 and knife 11 are adapted to be operated by a hand lever, generally designated at 18. The hand lever 18 is of appreciably elongated form to facilitate operation of the cutter with very little manual pressure being exerted, while yet providing for effective operation of the cutter.

The top member 5 of the frame is provided with a slot 19 extending therethrough, within which one end portion of the hand lever 18 extends. This portion of the hand lever 18 is pivotally mounted at 20, preferably on an anti-friction bearing support, for swinging movement relative to the frame. On the opposite side of the pivot 20 from the major portion of the length of the hand lever 18 is a short lever arm pivotally connected at 21 with a knuckle device, generally designated at 22, which in turn is connected with the head 8 of the cutter. The knuckle device 22 includes a yoke 23 connected at one end with the pivot 21, and at the opposite end having a screw 24 swiveled therein, which screw is also threaded into a yoke 25 that is connected by a pivot 26 to the cutter head 8. The screw 24 has a handle portion 24' thereon, formed by a plurality of radially projecting fingers rigid with the screw for turning action of the latter. The pivots 20, 21 and 26, preferably, include anti-friction bearings for ease of operation.

As noted above, the pivot 21 is located substantially at one side of the pivot 20 when the hand lever 18 is in a horizontal position, and connects the knuckle device 22 with a short arm of the hand lever 18, which short arm extends substantially at right angles to the length of the hand lever in such position that great pressure is exerted on the cutter knife 11 especially when the knuckle device 22 gets close to the center line between the pivots 20, 21 and 26, as shown in Fig. 5. When the hand lever is moved to its lowered position, generally horizontal in the example illustrated, the pivot points 20, 21 and 26 are all substantially in a vertical plane, which is substantially the cutting position of the knife 11. This reduces the amount of pressure needed for cutting, and increases the leverage of the hand lever acting on the cutter.

Provision is made also, through the adjustable screw 24, for adjustment of the cutter with respect to the hand lever so as to raise or lower the knife 11 relative to a pre-determined position, and to insure that the knife will cut through the material cleanly without being driven excessively deep into the cutter block 14 or other support for the material. Furthermore, adjustment is required to accommodate for the sharpening of the knife, as is required from time to time, during which a portion of the cutting edge is taken off and the knife must be re-positioned to accommodate therefor.

Figure 6:
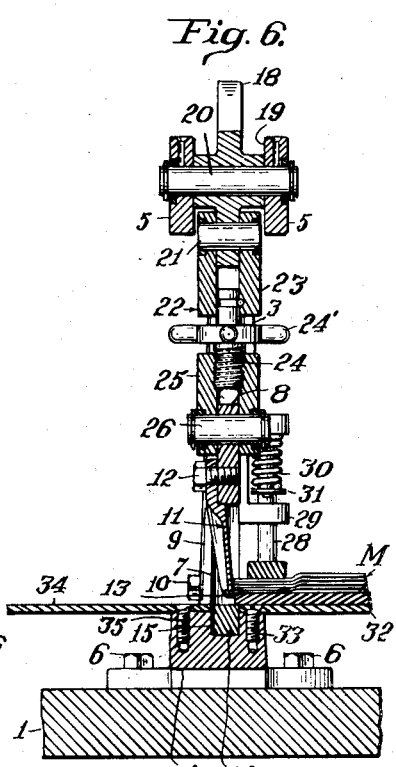
Fig. 6 is a vertical cross section through the machine on the line 6—6 in Fig. 8.
Figure 7:
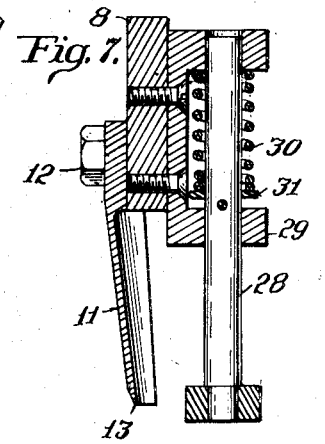
Fig. 7 is a detail cross section through the material clamp on the line 7—7 in Fig. 4.

The material is shown at M in Figs. 1 and 6, and is adapted to be held in place by a pressure bar 27 supported by a pair of pins 28 that extend vertically through openings in guide yokes 29 secured to one side of the cutter head 8, as shown in detail in Fig. 7. A coiled spring 30 is sleeved over each of the pins 28 and is interposed between one side of the yoke 29 and a fixed abutment 31 on each pin 28, to exert downward pressure on the pin and connected portion of the pressure bar 27. The fixed abutment 31 is in such position on each pin 28 as normally to disposed the pressure bar 27 with its bottom face somewhat below the cutting edge 13 of the knife 11, as will be apparent from Figs. 4 and 7, when the knife is in raised position. Upon swinging movement of the hand lever 18 to lower the knife to its cutting position, the pressure bar 27 is moved downward into bearing relation with the top of the material M and will engage the latter and hold it securely in place. The springs 30 will yield sufficiently to permit further downward movement of the cutter head 8 after the bar 27 is in clamping relation with the material.

The material M is supported on a work plate 32 secured on one side of the frame 2 by screws 33 (see Fig. 6). A similar work plate may be provided at 34 on the opposite side of the frame 2 and also secured by screws 35 to the frame. These work plates 32 and 34 are shown as extending in opposite directions from the frame 2, substantially in horizontal alignment, for supporting the material thereon during the cutting operation. Each of the top surfaces of the work plates may be squared off with crossed lines to facilitate the laying-out of the material, and suitable indicia may be provided thereon, as indicated at 32' in Fig. 3, to designate the respective sizes of the swatches being cut.

A guide is shown at 36 extending along one side of the work plate 32 to guide the material M in to the cutter. This guide 36, preferably, is mounted adjustably on the work plate 32 to vary the size of the swatch pieces. Such adjustment is provided by brackets 37, each of which is slotted at 38 and receives therethrough a set screw 39 threaded into the work plate 32. Upon loosening the screws 39, the guide 36 can be adjusted toward or away from the center of the work plate 32, and then the screws may be tightened to secure the guide in its proper position with respect thereto. The provision of such a guide along an edge of the work plate facilitates the pinking operation along the four edges of a sample book, if desired, and enables the material to be cut absolutely square at the corners, which is desirable. The adjustment of the guide provides for cutting samples of different sizes, and also makes it possible to cut along different portions of the knife 11 in the event that one portion thereof should become worn.

It is also possible to adjust the guide 11 to other positions with respect to the work plate 32. For instance, holes are shown at 40 in the work plate at the opposite edge thereof from the position of the guide in Fig. 3, to receive, selectively, the set screws 39 for securing the guide in a reversed position with respect to the work plate.

In the operation of the swatch cutter, it will be evident that the material to be cut to different sizes and shapes and, preferably, pinked on the edges thereof, will be placed in a pile of suitable thickness to form a book, on the work plate 32. With the hand lever 18 raised to the position shown in Fig. 4, the material may extend under the knife 11, across the work plates 32 and 34, with a suitable quantity of material on the former to form the desired size of swatches. Upon moving the hand lever 18 down to the position shown in Figs. 1 and 5, the cutter head 8 is lowered, moving the pressure bar 27 into clamping relation with the material M on the work plate 32, and continues down to move the knife 11 into cutting relation through the material in opposition to the cutter block 14, severing the material along the edge of the knife. It is preferred that a pinking edge be provided. If desired, a thin cardboard may be placed under the material to facilitate handling the swatches after they are cut.

Very little pressure is required by the operator due to the knuckle action provided in the machine, by reason of the fact that the knuckle device 22 moves substantially into straight line position, as shown in Fig. 5, when the cutting edge of the knife 11 reaches its cutting position. This multiplies the pressure from the lever to the knife and increases greatly the action thereon.

The machine supported by the bed plate 1 is capable of being transported readily from place to place and forms a compact unitary cutting device. However, if the machine is to be used in a fixed position, it may be mounted securely upon a supporting frame or legs, as designated generally at 41 in Fig. 9, which latter may be secured, if desired, to the floor or rest thereon as a fixed support for the machine. Otherwise, the cutting machine operates substantially as described above.

Another modification is shown in Figs. 10 and 11, which may be used if desired, and is particularly applicable to machine of large sizes. This modification includes a safety catch which will lock the hand lever 18 in its raised position and hold the cutter head against accidental dropping when an operator's hand may be located beneath the cutter, which would cause severe injury thereto.

This safety catch includes a sliding bolt 42 slidably mounted in the top portion 5 of the frame 2, in position to enter an opening 43 formed in the hand lever 18. The bolt 42 is provided with a handle 44 on the outer end thereof to facilitate withdrawing of the bolt to release the hand lever.

The sliding bolt 42 normally is urged inward by a coiled spring 45 sleeved thereon and enclosed within a housing 46 secured to one side of the frame top member 5 by screw fastenings 47. The coiled spring 45 is under compression and is interposed at one end against the housing 46, and at the opposite end against a stop ring 48 secured rigidly to the sliding bolt 42, whereby the spring normally tends to urge the bolt into engagement with the opening 43 in the hand lever 18.

Whenever the handle 18 is raised to its upper position, the sliding bolt 42 enters the opening 43 and automatically locks the hand lever in its raised position by the action of the spring 45 acting on the sliding bolt. However, upon withdrawing of the sliding bolt, the lever may be released for the cutting action. When the lever is locked in its raised position, the knife is held against accidental operation which might cause serious injury to the hands or fingers of a workman. This is especially true on larger machines where heavier cutter heads and levers are used. While the invention has been illustrated and described in certain embodiments, it is recognized that variations and changes may be made therein without departing from the invention, except as specified in the claims.

I claim:

1. A swatch cutting machine comprising a frame having a pair of spaced substantially parallel uprights connected at their respective upper ends to the opposite ends of a crossbar having a vertically extending slot formed therein intermediate its ends, each of said uprights having a guideway formed therein and in opposition to each other, a cutter head having an upper side and a pair of opposed ends each of which is slidably mounted in one of said guideways, respectively, for reciprocation therein, an inverted substantially U-shaped yoke having the arms thereof pivotally connected to said upper side of said cutter head midway between said ends thereof, said U-shaped yoke having an internally threaded aperture, a screw having a pair of opposed ends and having external threads adjacent one end thereof for threaded adjustable engagement within said aperture, a second substantially U-shaped yoke having an aperture extending transversely through the base thereof, means securing the other end of said screw within said last aperture for rotation about its longitudinal axis, said second U-shaped yoke having the arms thereof extending into said slot, an elongated lever pivotally mounted adjacent one of its ends within said slot approximately midway between said uprights, said lever comprising a long arm and a short arm extending generally at right angles from said pivot, means pivotally connecting said arms of said second U-shaped yoke to opposite sides of the short arm of said lever, and means mounted on said screw for turning said screw to adjusted position whereby when the lever is operated to move said cutter head into its lowermost position, said pivotal connections of said first and second yokes and the short arm of said lever move into substantial alignment.

2. In a swatch cutting machine as defined in claim 1, a removable cover plate forming a lateral side of each vertically extending guideway in the frame upright and detachable therefrom for removal of the cutter head.

3. In a swatch cutting machine as defined in claim 1, a spring-pressed bolt mounted on the frame in position for engaging the lever in one position for holding the cutter head in a set position.

RICHARD C. MAXANT.

References Cited in the file of this patent

UNITED STATES PATENTS

| Number | Name | Date |
|---|---|---|
| 48,479 | Bradley | June 27, 1865 |
| 112,623 | Paine | Mar. 14, 1871 |
| 238,125 | Jones | Feb. 22, 1881 |
| 323,389 | Beals | Aug. 4, 1885 |
| 375,105 | Stimpson | Dec. 20, 1887 |
| 966,689 | Johnson | Aug. 9, 1910 |
| 1,141,305 | Berg | June 1, 1915 |
| 1,601,414 | Purple | Sept. 28, 1926 |
| 2,122,186 | Southworth | June 28, 1938 |

FOREIGN PATENTS

| Number | Country | Date |
|---|---|---|
| 350,853 | France | June 4, 1905 |
| 14,240 | Great Britain | June 21, 1906 |
| 362,127 | France | June 7, 1906 |
| 311,184 | Great Britain | Mar. 20, 1930 |